(12) United States Patent
Shah et al.

(10) Patent No.: US 11,595,260 B2
(45) Date of Patent: *Feb. 28, 2023

(54) AUTOMATIC PLACEMENT OF CLIENTS IN A DISTRIBUTED COMPUTER SYSTEM SATISFYING CONSTRAINTS

(71) Applicant: VMware, Inc., Palo Alto, CA (US)

(72) Inventors: Parth Shah, Mountain View, CA (US); Pradeep Padala, San Jose, CA (US); Ajay Gulati, Palo Alto, CA (US)

(73) Assignee: VMWARE, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,645

(22) Filed: Jan. 8, 2021

(65) Prior Publication Data
US 2021/0160141 A1    May 27, 2021

Related U.S. Application Data

(63) Continuation of application No. 16/417,793, filed on May 21, 2019, now Pat. No. 10,924,349, which is a continuation of application No. 15/484,027, filed on Apr. 10, 2017, now Pat. No. 10,305,741, which is a
(Continued)

(51) Int. Cl.
*H04L 41/0893*    (2022.01)
*G06F 9/455*       (2018.01)
*H04L 41/046*     (2022.01)

(52) U.S. Cl.
CPC ...... *H04L 41/0893* (2013.01); *G06F 9/45533* (2013.01); *G06F 9/45558* (2013.01); *H04L 41/046* (2013.01); *G06F 2009/4557* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,947,992 B1 * | 9/2005 | Shachor | H04L 67/563 709/227 |
| 7,555,544 B1 | 6/2009 | Rattner et al. | |

(Continued)

OTHER PUBLICATIONS

"VMware High Availability: Easily Deliver High Availability for All of your Virtual Machines"; http://www.vmware.com/files/pdfNMware-High-Availability-DS-EN.pdf; 2009.
(Continued)

*Primary Examiner* — Lashonda Jacobs-Burton
(74) *Attorney, Agent, or Firm* — Thomas | Horstemeyer, LLP

(57) ABSTRACT

A cloud management server and method for performing automatic placement of clients in a distributed computer system uses a list of compatible clusters to select an affinity cluster to place the clients associated with an affinity constraint. As part of the placement method, a cluster that cannot satisfy any anti-affinity constraint associated with the clients and the affinity constrain is removed from the list of compatible clusters. After the affinity cluster has been selected, at least one cluster in the distributed computer system is also selected to place clients associated with an anti-affinity constraint.

20 Claims, 14 Drawing Sheets

Related U.S. Application Data continuation of application No. 14/099,872, filed on Dec. 6, 2013, now Pat. No. 9,621,427.

(56) References Cited

U.S. PATENT DOCUMENTS

| | | | |
|---|---|---|---|
| 8,782,242 B2* | 7/2014 | Ahmad | H04L 41/5054 709/229 |
| 8,825,863 B2* | 9/2014 | Hansson | G06F 9/5077 709/224 |
| 9,052,935 B1* | 6/2015 | Rajaa | G06F 9/45558 |
| 9,098,201 B2* | 8/2015 | Benjamin | G06F 3/067 |
| 9,372,706 B2* | 6/2016 | Farkas | G06F 9/45558 |
| 9,489,242 B2 | 11/2016 | Uniyal | |
| 9,823,941 B2* | 11/2017 | Cropper | G06F 9/5077 |
| 9,846,589 B2* | 12/2017 | Udupi | G06F 9/45558 |
| 9,946,527 B2* | 4/2018 | Sharma | G06F 8/60 |
| 10,616,134 B1* | 4/2020 | Greenwood | H04L 47/821 |
| 10,623,481 B2* | 4/2020 | Snider | G06F 9/505 |
| 11,165,783 B1* | 11/2021 | Eiers | H04L 41/0893 |
| 2001/0052024 A1 | 12/2001 | Devarakonda et al. | |
| 2011/0213911 A1* | 9/2011 | Eidus | G06F 9/4856 718/1 |
| 2011/0225277 A1* | 9/2011 | Freimuth | G06F 9/45558 718/1 |
| 2011/0231696 A1* | 9/2011 | Ji | G06F 11/1484 718/1 |
| 2012/0226788 A1* | 9/2012 | Jackson | G06F 9/4881 709/223 |
| 2012/0266166 A1* | 10/2012 | Farkas | G06F 9/5077 718/1 |
| 2012/0324021 A1 | 12/2012 | Cao | |
| 2012/0324071 A1* | 12/2012 | Gulati | G06F 9/5044 709/223 |
| 2013/0080619 A1* | 3/2013 | Assuncao | G06F 9/5077 709/224 |
| 2013/0097319 A1* | 4/2013 | Ahmad | G06F 9/45533 709/226 |
| 2013/0263120 A1* | 10/2013 | Patil | G06F 9/45558 718/1 |
| 2014/0059228 A1* | 2/2014 | Parikh | H04L 67/1012 709/226 |
| 2014/0101300 A1* | 4/2014 | Rosensweig | G06F 9/5072 709/223 |
| 2014/0223122 A1* | 8/2014 | Butt | G06F 9/5088 711/162 |
| 2014/0337832 A1* | 11/2014 | Adogla | G06F 9/45558 718/1 |
| 2014/0380307 A1* | 12/2014 | Zhu | G06F 9/5072 718/1 |
| 2015/0039764 A1* | 2/2015 | Beloglazov | H04L 67/52 709/226 |
| 2015/0113144 A1* | 4/2015 | Bauer | H04L 41/0897 709/226 |
| 2015/0120931 A1* | 4/2015 | Padala | G06F 9/5077 709/226 |
| 2015/0120932 A1* | 4/2015 | Vissamsetti | G06F 9/5044 709/226 |
| 2015/0163157 A1* | 6/2015 | Hao | H04L 47/70 709/226 |
| 2015/0193245 A1* | 7/2015 | Cropper | G06F 9/45533 718/1 |
| 2015/0236978 A1* | 8/2015 | Gulati | G06F 9/5088 709/226 |
| 2015/0248305 A1* | 9/2015 | Shu | G06F 9/5077 718/1 |
| 2015/0341223 A1* | 11/2015 | Shen | G06F 9/5077 709/223 |
| 2015/0370583 A1* | 12/2015 | Shah | G06F 9/542 703/22 |
| 2016/0085593 A1* | 3/2016 | Anderson | G06F 9/5077 718/1 |

OTHER PUBLICATIONS

VMware vCloud Director, 2011, http://www.vmware.com/products/vcloud-director/overview.html.

Gulati et al.; "dweights: Taming the Multi-Headed Monster for VM Placement in the Cloud"; In RADIO, 2011.

* cited by examiner

AUTOMATIC PLACEMENT OF CLIENTS IN A DISTRIBUTED COMPUTER SYSTEM SATISFYING CONSTRAINTS

CROSS-REFERENCE TO RELATED APPLICATIONS

This application is a continuation of and claims the benefit of U.S. patent application Ser. No. 16/417,793, filed May 21, 2019, now U.S. Pat. No. 10,924,349, entitled "AUTOMATIC PLACEMENT OF CLIENTS IN A DISTRIBUTED COMPUTER SYSTEM SATISFYING CONSTRAINTS," U.S. patent application Ser. No. 15/484,027, filed Apr. 10, 2017, now U.S. Pat. No. 10,305,741, entitled "AUTOMATIC PLACEMENT OF CLIENTS IN A DISTRIBUTED COMPUTER SYSTEM SATISFYING CONSTRAINTS," and U.S. patent application Ser. No. 14/099,872, filed Dec. 6, 2013, now U.S. Pat. No. 9,621,427, entitled "AUTOMATIC PLACEMENT OF CLIENTS IN A DISTRIBUTED COMPUTER SYSTEM SATISFYING CONSTRAINTS," which are incorporated herein by reference in their entireties.

BACKGROUND

Placement of resource-consuming clients, such as virtual machines (VMs), on host devices in a distributed computer system is an important factor in efficiently utilizing physical resources in the distributed computer system. An effective client placement strategy must satisfy the constraints of the clients and optimize several, sometimes conflicting, goals, while taking into consideration the complexities of the distributed computer system.

As an example, a constraint may be to reduce VM to VM communication overhead by placing VMs together on a cluster (affinity). Another constraint may be to increase resource availability by separating two VMs onto different clusters (anti-affinity). These constraints can make it difficult to come up with a placement solution that matches the VMs requirements while balancing utilization of the distributed computer system.

SUMMARY

A cloud management server and method for performing automatic placement of clients in a distributed computer system uses a list of compatible clusters to select an affinity cluster to place the clients associated with an affinity constraint. As part of the placement method, a cluster that cannot satisfy any anti-affinity constraint associated with the clients and the affinity constrain is removed from the list of compatible clusters. After the affinity cluster has been selected, at least one cluster in the distributed computer system is also selected to place clients associated with an anti-affinity constraint.

A method for performing automatic placement of clients in a distributed computer system in accordance with an embodiment of the invention comprises selecting an affinity constraint associated with a first set of clients, determining whether any of the clients associated with the affinity constraint is associated with any anti-affinity constraint, removing a cluster of host computers that cannot satisfy the any anti-affinity constraint from a list of compatible clusters of host computers in the distributed computer system, the compatible clusters being clusters that are compatible with the clients associated with the affinity constraint, selecting an affinity cluster from the list of compatible clusters to place the clients associated with the affinity constraint, selecting an anti-affinity constraint associated with a second set of clients, and selecting at least one cluster in the distributed computer system to place the clients associated with the anti-affinity constraint. In some embodiments, the steps of this method are performed when program instructions contained in a computer-readable storage medium is executed by one or more processors.

A cloud management server for a distributed computer system in accordance with an embodiment of the invention comprises a cloud placement module configured to generate placement solutions for clients to be placed in clusters of host computers in the distributed computer system. The cloud placement engine is further configured to select an affinity constraint associated with a first set of clients, determine whether any of the clients associated with the affinity constraint is associated with any anti-affinity constraint, remove a cluster of host computers that cannot satisfy the any anti-affinity constraint from a list of compatible clusters of host computers in the distributed computer system, the compatible clusters being clusters that are compatible with the clients associated with the affinity constraint, select an affinity cluster from the list of compatible clusters to place the clients associated with the affinity constraint, select an anti-affinity constraint associated with a second set of clients, and select at least one cluster in the distributed computer system to place the clients associated with the anti-affinity constraint.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
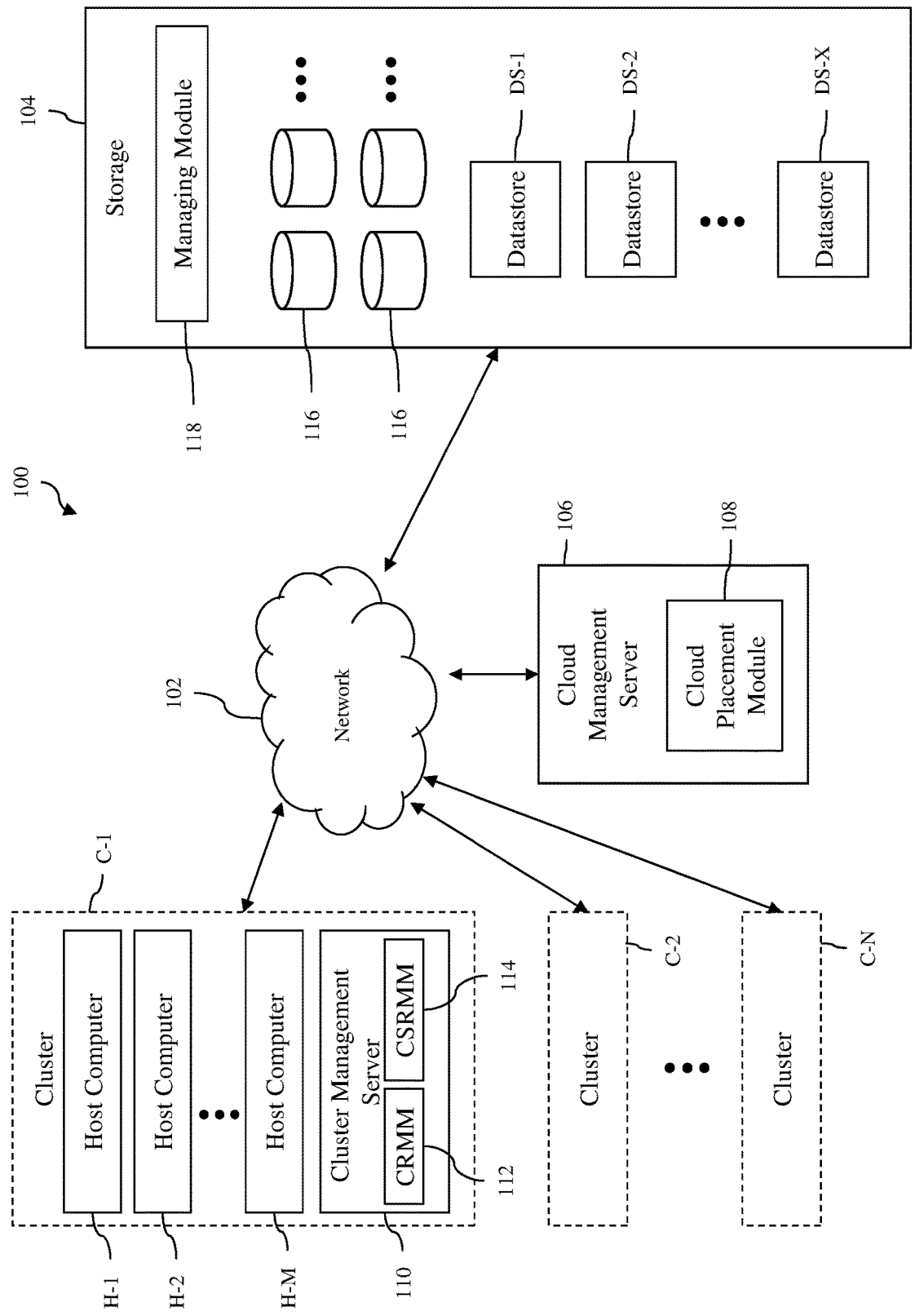
FIG. 1 is a block diagram of a distributed computer system in accordance with an embodiment of the invention.

Turning now to FIG. 1, a distributed computer system (cloud) 100 in accordance with an embodiment of the invention is shown. As shown in FIG. 1, the cloud includes a network 102, clusters C-1, C-2 . . . C-N (where N is a positive integer) of host computers, storage 104 and a cloud management server 106 with a cloud placement module 108. The exact number of host computer clusters included in the cloud can be from few clusters to tens of clusters or more. The host computers of the different clusters, the storage, and the cloud management server are connected to the network. Thus, each of the host computers in the clusters is able to access the storage via the network and may share the resources provided by the storage with the other host computers. Consequently, any process running on any of the host computers may also access the storage via the network.

In the illustrated embodiment, each of the clusters C-1, C-2 . . . C-N includes a number of host computers H-1, H-2 . . . H-M (where M is a positive integer) and a cluster management server 110 with a cluster resource management module (CRMM) 112 and a cluster storage resource management module (CSRMM) 114. The number of host computers included in each of the clusters can be any number from one to several hundred or more. In addition, the number of host computers included in each of the clusters can vary so that different clusters can have a different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in datacenters. As an example, the host computers may be servers installed in one or more server racks. Typically, the host computers of a cluster are located within the same server rack.

Figure 2:
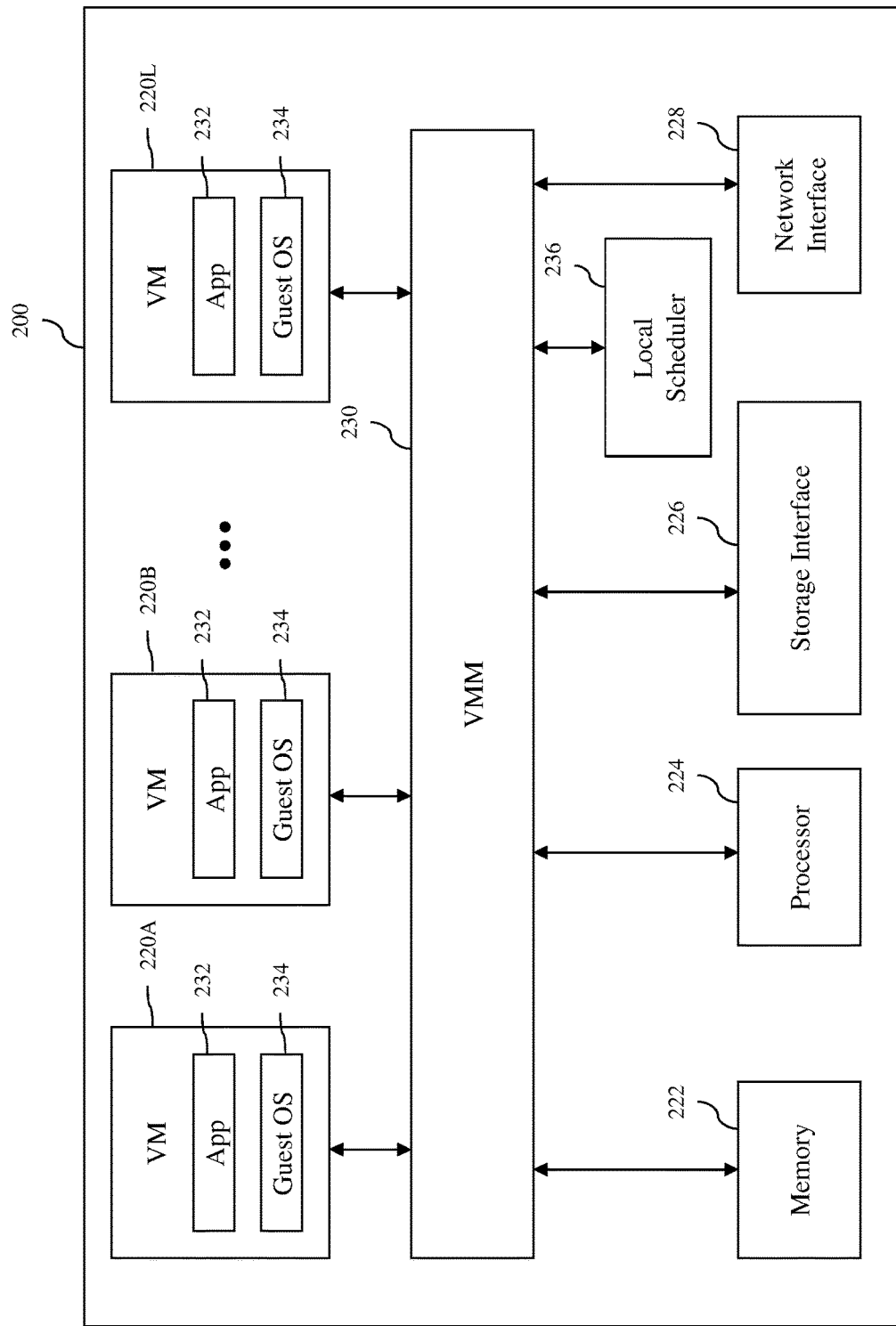
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on top of a virtual machine monitor 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system 232 and one or more guest applications 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local scheduler 236 that operates as part of a resource management system, such as VMware Distributed Resource Scheduler (DRS), to manage resource requests made by the VMs 220A, 220B . . . 220L. Although the local scheduler is illustrated in FIG. 2 as being separate from the virtual machine monitor 230, the local scheduler may be implemented as part of the virtual machine monitor. In some embodiments, the local scheduler is implemented as software programs running on the host computer. However, in other embodiments, the local scheduler may be implemented using any combination of software and hardware.

Turning back to FIG. 1, each of the cluster management servers 110 in the clusters C-1, C-2 . . . C-N operates to monitor and manage the host computers H-1, H-2 . . . H-M in the respective cluster. Each cluster management server may be configured to monitor the current configurations of the host computers and the clients running on the host computers, for example, virtual machines (VMs), in the respective cluster. The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the respective cluster management server.

The cluster management servers 110 may also perform various operations to manage the clients and the host computers H-1, H-2 . . . H-M in their respective clusters. As illustrated in FIG. 1, in an embodiment, each cluster management server includes the cluster resource management module (CRMM) 112, which can be enabled by a user, to perform resource allocations and load balancing in the respective cluster. The cluster resource management module operates to allocate available resources among clients running in the cluster based on a number of parameters, which may include predefined rules and priorities. The cluster resource management module may be configured to select an appropriate host computer in the cluster when a new client is to be added to the cluster. The cluster resource management module may be configured to power down particular clients and/or host computers in the cluster to conserve power. The cluster resource management module in the cluster management server may be configured or programmed to perform other operations to manage the cluster. Each cluster management server may also include the cluster storage resource management module (CSRMM) 114, which can be enabled by a user, to perform storage resource management for the respective cluster. The cluster storage resource management module enables client disk placements (e.g., VM disk placements) and migrations to balance space and I/O resources across datastores that are associated with the cluster via recommendations or automated operations.

In some embodiments, the cluster management servers 110 may be physical computers. In other embodiments, the cluster management servers may be implemented as software programs running on physical computers, such as the host computer 200 shown in FIG. 2, or virtual computers, such as the 220A, 220B . . . 220L. In an implementation, the cluster management servers are VMware vCenter™ servers with at least some of the features available for such servers, the resource management modules 112 in the cluster management servers are VMware Distributed Resource Schedulers and the storage resource management modules 114 in the cluster management servers are VMware Storage Distributed Resource Schedulers.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers of the clusters C-1, C-2 . . . C-N, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 116, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 118, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters C-1, C-2 . . . C-N. For virtual machines, the datastores may be used to store virtual storage, e.g., virtual disks, used by each of the virtual machines, as well as other files needed to support the virtual machines. One or more datastores may be associated with one or more clusters. The same datastore may be associated with more than one cluster.

The cloud management server 106 operates to monitor and manage the clusters C-1, C-2 . . . C-N to provide a cloud environment using the host computers H-1, H-2 . . . H-M in the clusters. The cloud management server allows users or customers to create and use virtual datacenters (VDCs) with specified resource requirements. One VDC may include clients running on different host computers that are part of different clusters. Thus, in a single cluster, a group of clients running on the host computers of that cluster may belong to one VDC, while the other clients running on the host computers of the same cluster may belong to other VDCs. It is also possible that, in a single host computer, one or more clients running on that host computer belong to one VDC, while the other clients running on the same host computer belong to other VDCs. The cloud management server performs operations to manage the VDCs supported by the distributed computer system. In some embodiments, the cloud management server may be a physical computer. In other embodiments, the cloud management server may be implemented as a software program running on a physical computer or a VM, which may be part of one of the clusters C-1, C-2 . . . C-N. In an implementation, the cloud management server is VMware vCenter™ server.

The cloud placement module 108 in the cloud management server 106 operates to determine initial placement of new clients in the cloud environment provided by the distributed computer system 100, such as a VDC that includes multiple clusters. The cloud placement module may be implemented as software, hardware, firmware or any combination of software, hardware and/or firmware. In an exemplary embodiment, the cloud placement module is implemented as a software program installed in the cloud management server 106.

Figure 3:
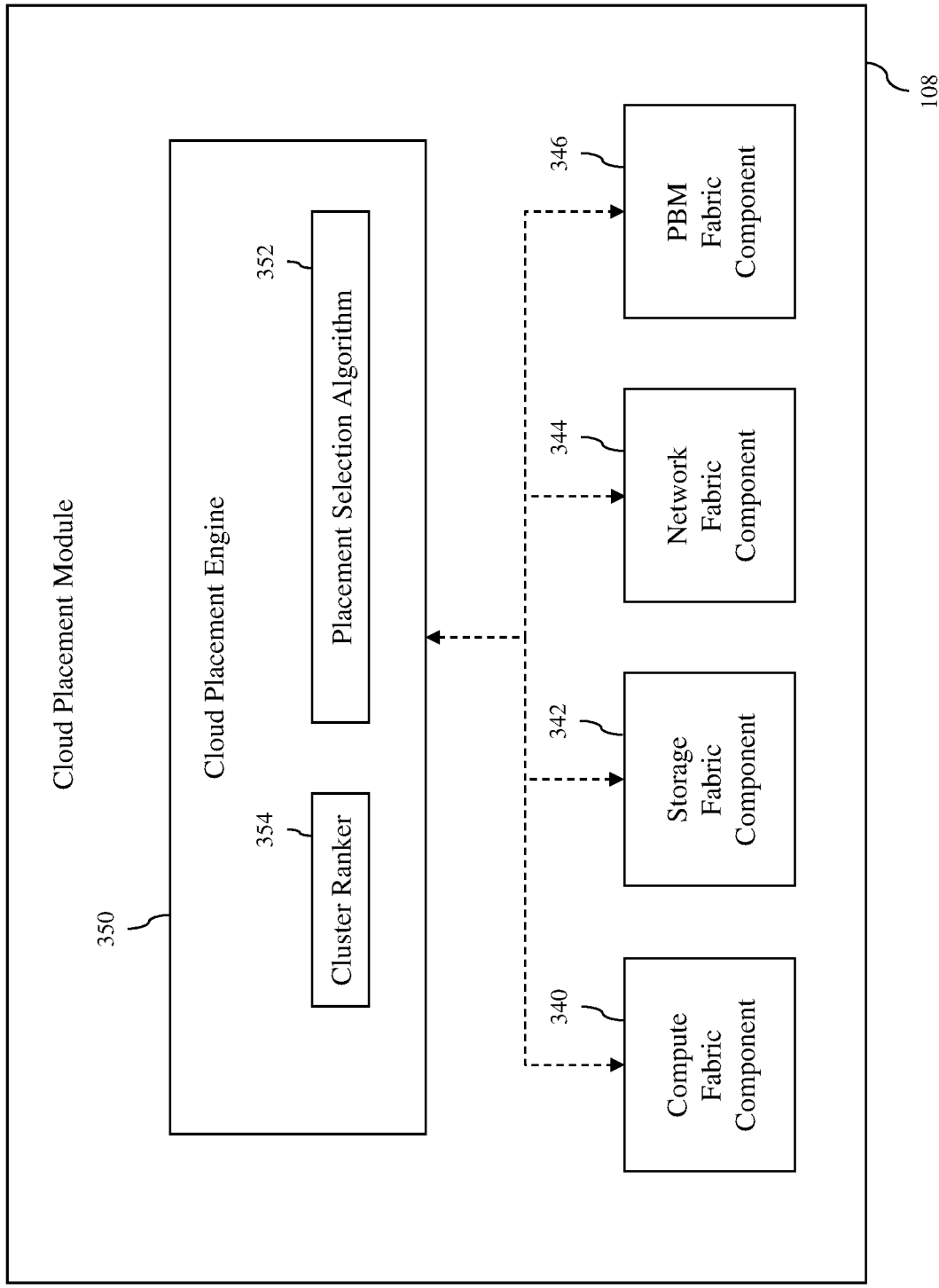
FIG. 3 is a block diagram of a cloud placement module in accordance with an embodiment of the invention.

Turning now to FIG. 3, a block diagram of the cloud placement module 108 in accordance with an embodiment of the invention is illustrated. As shown in FIG. 3, the cloud placement module 108 includes a compute fabric component 340, a storage fabric component 342, a network fabric component 344, a policy based management (PBM) fabric component 346 and a cloud placement engine 350. These components of the cloud placement module may be implement in hardware, software, firmware or any combination of hardware, software and/or firmware. In one implementation, these components of the cloud placement module are implemented as one or more software programs installed in the cloud management server 106, which are executed by one or more processors associated with the cloud management server.

The compute fabric component 340, the storage fabric component 342, the network fabric component 344 and the PBM fabric component 346 operate to aggregate and manage the various resources in the distributed computer system 100. The compute fabric component aggregates the compute resources, e.g., the CPU and RAM resources, in the distributed computer system and manages these resources. The storage fabric component aggregates the storage resources in the distributed computer system and manages these resources. The network fabric component aggregates the network resources, i.e., network bandwidth, in the distributed computer system and manages these resources. The PBM fabric component aggregates policies in the distributed computer system and manages these resources. One of the policies may be the storage class for a virtual disk of a VM. For example, a datastore can be one of three user-defined storage classes: gold, silver and bronze. Other policies may include VM to VM affinity and anti-affinity policies. These rules can be at host level or at cluster level. A host level anti-affinity policy between two VMs will ensure that both VMs will be placed on different hosts. A cluster level affinity policy between two VMs will ensure that both VMs will be placed on hosts belonging to the same cluster.

The compute fabric component 340, the storage fabric component 342, the network fabric component 344 and the PBM fabric component 346 further operate to assist the cloud placement engine 350 in selecting a candidate cluster of host computers and/or a datastore in the distributed computer system 100 to place a client. In particular, when initiated, each fabric component analyzes a list of possible clusters to filter out ineligible clusters of host computers based on client requirements and returns an updated list of possible clusters for the client to be placed, as well as other information, such as resource utilization metrics.

In an embodiment, one of the fabric components generates a list of suitable clusters based on the client requirements for the resource handled by that fabric component. The remaining fabric components take turn pruning down the list of suitable clusters based on the client requirements for the respective resources handled by the fabric component. As a result, a final list of suitable clusters that meet all the resource (compute, storage, network and/or policy) constraints of the client to be placed is generated. The final list of suitable clusters along with utilization metrics for each resource can then be used for placement analysis by the cloud placement module 346.

As an example, a VM to be placed in the distributed computer system 100 may require a gold storage profile and other resource requirements. A VM requiring a gold storage profile cannot be placed in a cluster that is connected only to datastores with silver or bronze storage profiles. Thus, the storage fabric component 342 will create a list of clusters from all the possible clusters in the distributed computer system that does not include clusters only connected to datastores with silver or bronze storage profiles. For each remaining eligible cluster, the storage fabric component will return utilization metrics for the best datastore connected to that cluster. The compute fabric component 340 can then remove clusters from the list of suitable clusters that do not include any host computers with the specific compute capabilities required by the client to be placed. Similarly, the network fabric component 344 may remove clusters from the updated list of suitable clusters that do not have sufficient network bandwidth to support the specific network requirements of the VM to be placed. Lastly, the PBM fabric component 346 may remove candidate clusters from the latest updated list of suitable clusters that do not satisfy one or more policy requirements of the VM.

The cloud placement engine 350 operates to select a candidate cluster and/or a candidate datastore using the information provided by the compute fabric component 340, the storage fabric component 342, the network fabric component 344 and the PBM fabric component 346 for each placement. The cloud placement engine makes the selection by ranking the clusters in the final list of suitable clusters based on resource utilization metrics provided by the different fabric components, such as CPU, memory and/or network utilization metrics. If the storage fabric component was involved in the final list of suitable clusters, the cloud placement engine will implicitly select a candidate datastore since utilization metrics for the best datastore connected to each suitable cluster will have been provided by the fabric components along with the final list of suitable clusters. The cloud placement engine may use a placement selection algorithm 348 and a cluster ranker 350 that are executed by one or more processors associated with the cloud management server 106 to call on the different fabric components and select the candidate cluster and/or datastore for each client to be placed.

In addition to selecting the best cluster on which to place a client, the cloud placement engine 350 can accommodate affinity and anti-affinity constraints, which are sometimes referred to herein as affinity and anti-affinity rules. An affinity constraint usually specifies that clients, e.g., VMs, in a group should all be placed together in the same host or the same cluster. Conversely, anti-affinity constraints usually specify that clients in a group should be placed in different hosts or different clusters. Affinity and anti-affinity constraints can be defined as "hard constraints" that cannot be violated or "soft constraints" that, while a best-effort attempt should be made to satisfy the constraint, can be violated.

In the following description, virtual machines are used to illustrate various embodiments of the invention. However, it is noted herein that other types of clients can also benefit from these embodiments of the invention.

Figure 4A:
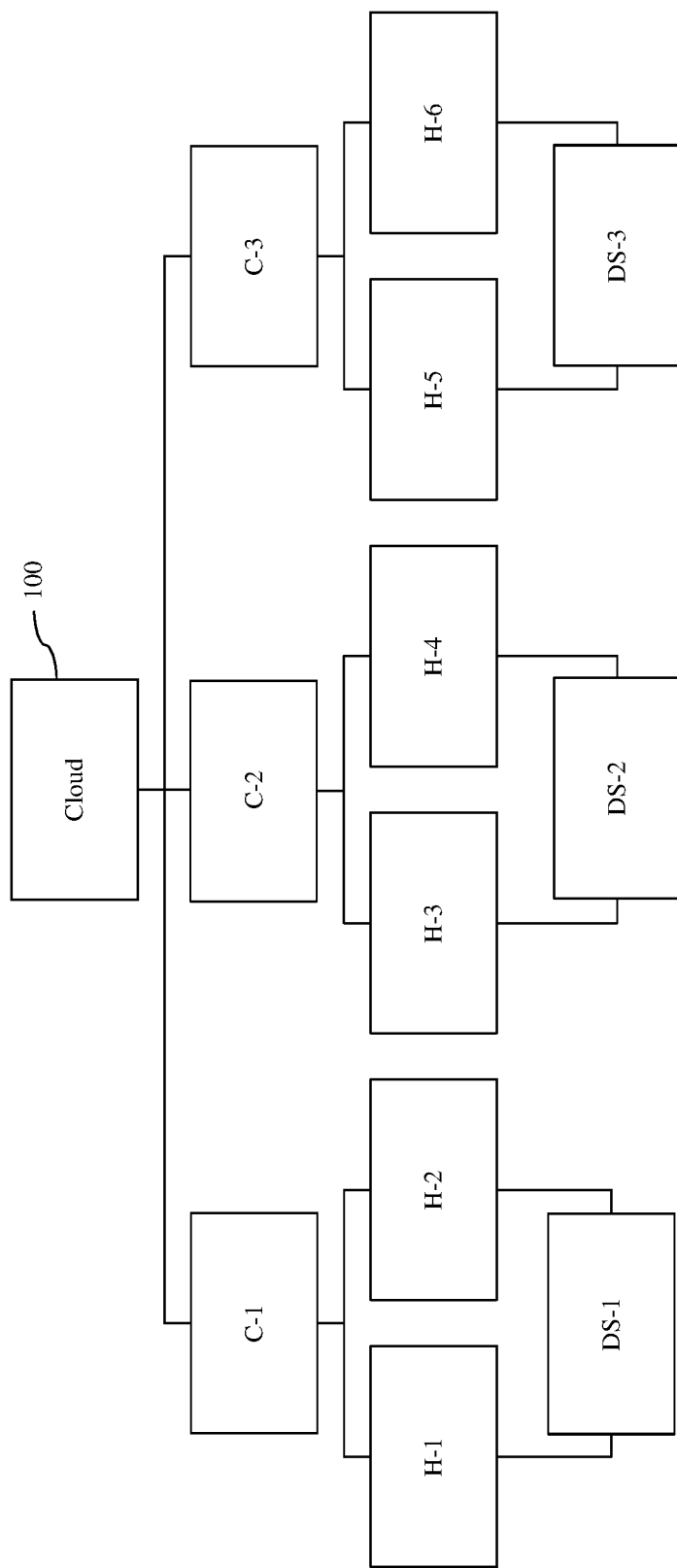
FIGS. 4A and 4B illustrate the placement of four virtual machines in a cloud in conformity with an affinity constraint in accordance with an embodiment of the invention.
Figure 4B:
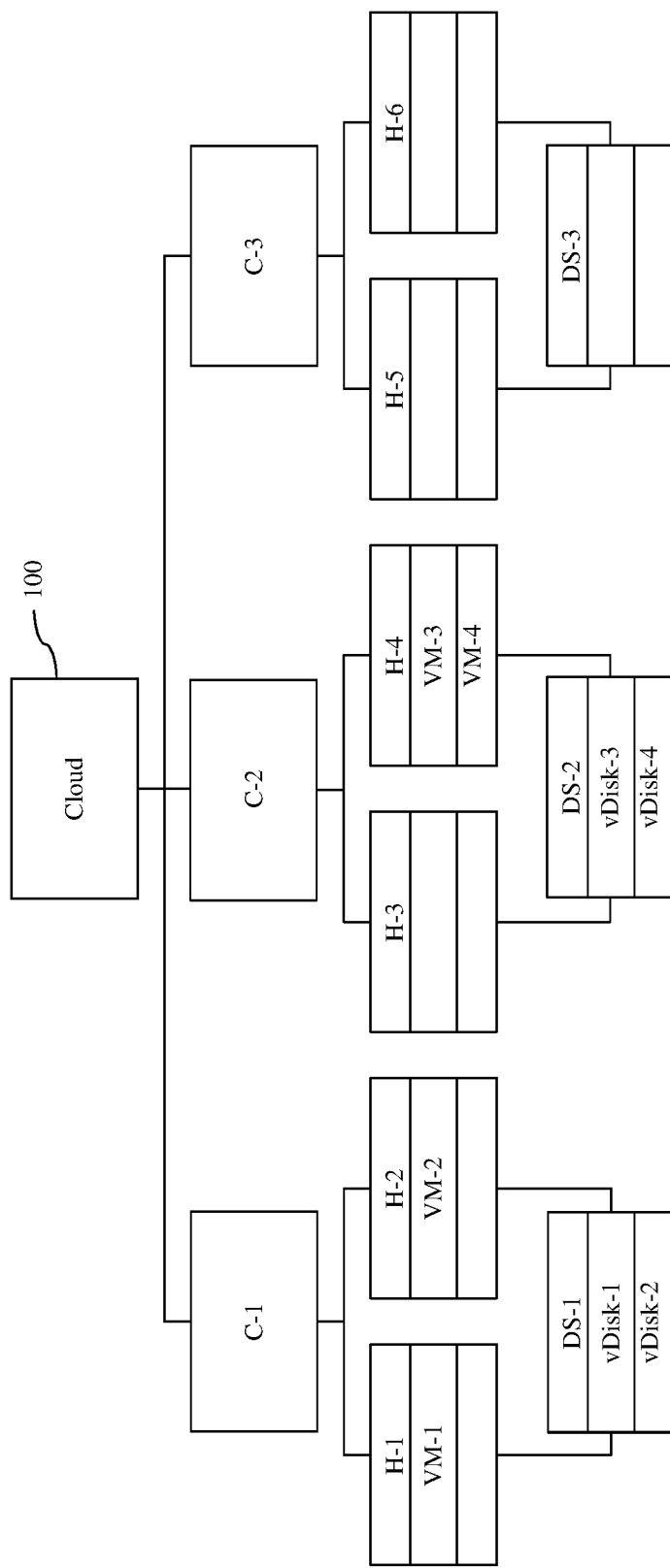

FIGS. 4A and 4B illustrate the placement of four virtual machines VM-1, VM-2, VM-3 and VM-4 in the cloud 100 in conformity with an affinity constraint in accordance with an embodiment of the invention. FIG. 4A shows the clusters C-1, C-2, and C-3 located within the cloud 100 prior to placement. The cluster C-1 includes the host computers H-1 and H-2 that share a datastore DS-1. The cluster C-2 includes the host computers H-3 and H-4 that share a datastore DS-2. The cluster C-3 includes the host computers H-5 and H-6 that share datastore DS-3. FIG. 4B shows the cloud after the placement of the four virtual machines. The virtual machines VM-1 and VM-2 have a cluster affinity constraint, but not a host affinity constraint. As a result, an acceptable placement of the virtual machines VM-1 and VM-2 would be to place the virtual machine VM-1 in the host computer H-1 and the virtual machine VM-2 in the host computer H-2 since both of these host computers are in the same cluster and place a virtual disk "vDisk-1" for the virtual machine VM-1 and a virtual disk "vDisk-2" for the virtual machine VM-2 both on the datastore DS-1, as illustrated in FIG. 4B. The virtual machines VM-3 and VM-4 have a host-affinity constraint and, thus, necessarily also have a cluster-affinity constraint although the cluster-affinity constraint may be implicit. As a result, an acceptable placement of the four VMs would be to place the virtual machines VM-3 and VM-4 in the host computer H-4 and a virtual disk "vDisk-3" for the virtual machine VM-3 and a virtual disk "vDisk-4" for the virtual machine VM-4 both on the datastore DS-2.

Figure 5A:
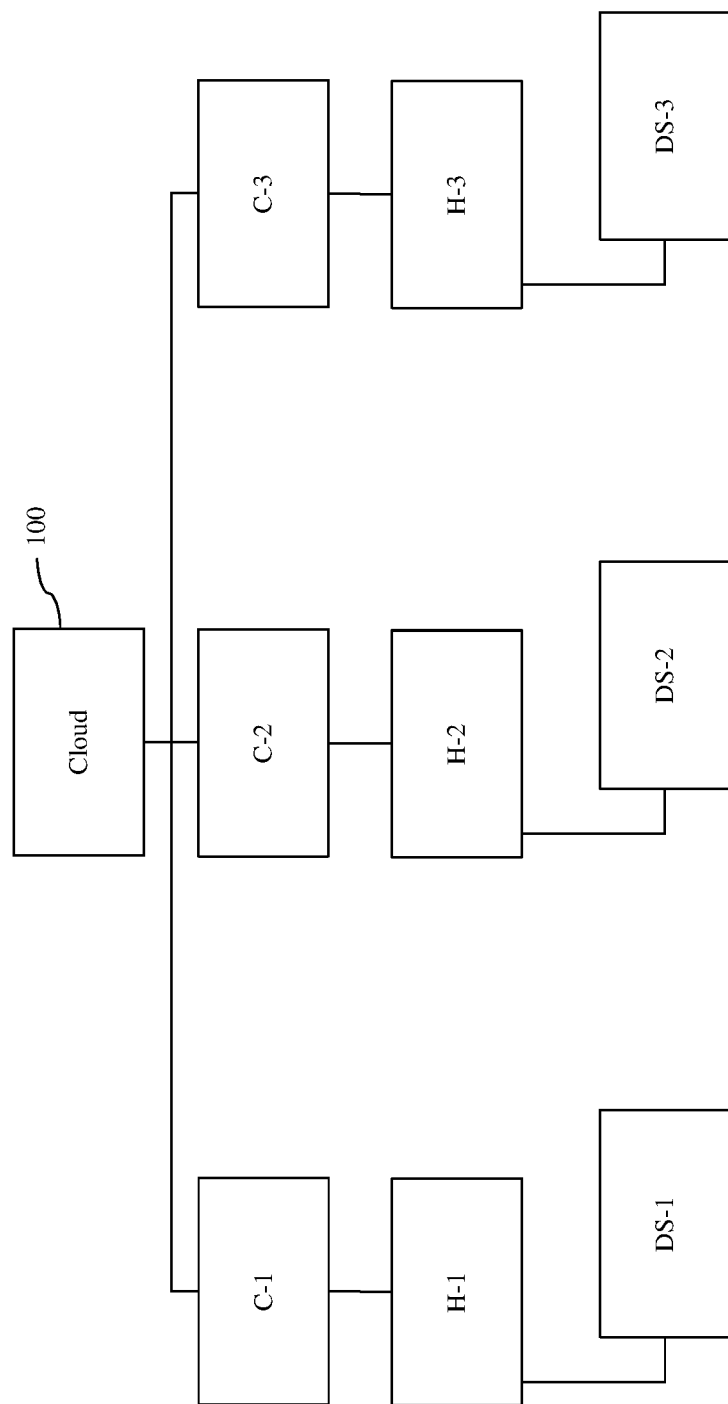
FIGS. 5A and 5B illustrate the placement of two virtual machines in a cloud in conformity with an anti-affinity constraint in accordance with an embodiment of the invention.
Figure 5B:
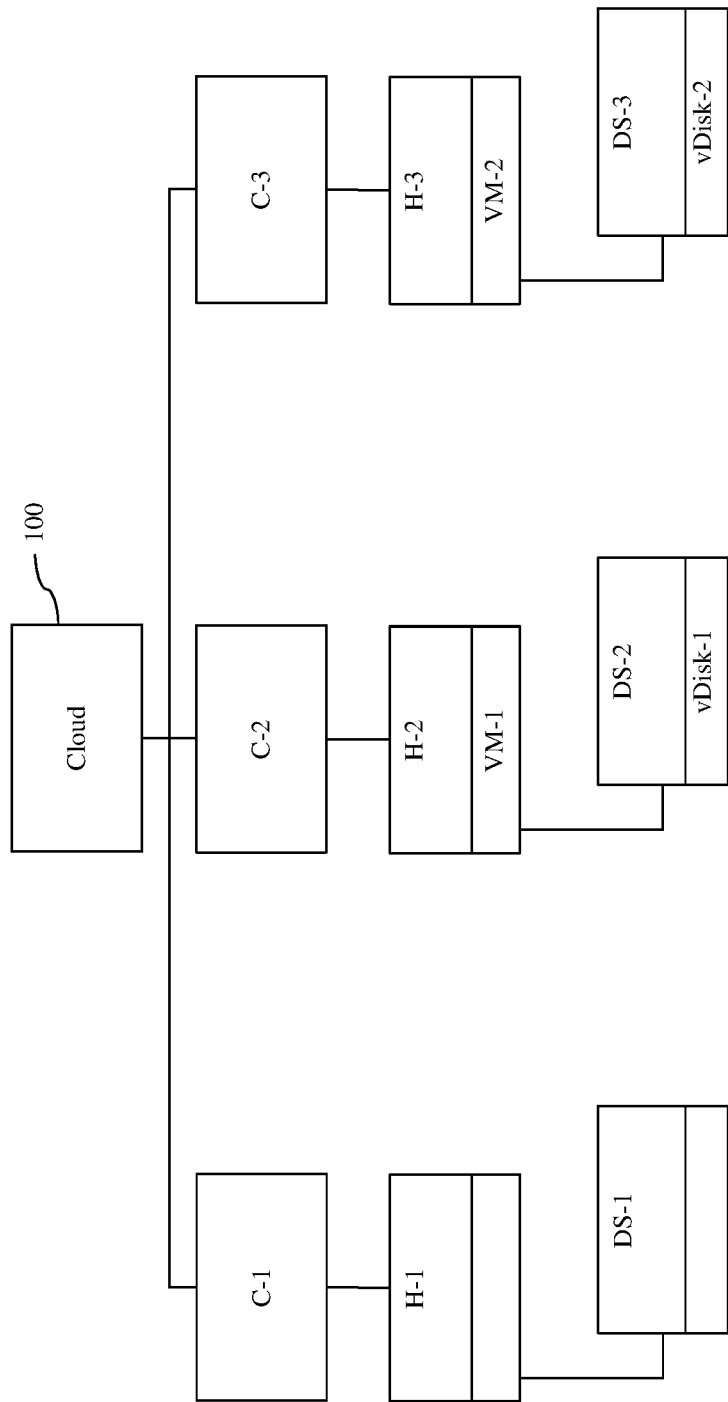

FIGS. 5A and 5B illustrate the placement of two virtual machines VM-1 and VM-2 in the cloud 100 in conformity with an anti-affinity constraint in accordance with an embodiment of the invention. FIG. 5A shows the clusters C-1, C-2, and C-3 located within the cloud 100 prior to placement. The cluster C-1 includes the host computer H-1 and the datastore DS-1. The cluster C-2 includes the host computer H-2 and the datastore DS-2. The cluster C-3 includes the host computer H-3 and the datastore DS-3. FIG. 5B shows the cloud after the placement of the virtual machines VM-1 and VM-2. The virtual machines VM-1 and VM-2 have a cluster-anti-affinity constraint. As a result, an acceptable placement of the virtual machines VM-1 and VM-2 would be to place the virtual machine VM-1 on the host computer H-2 and the virtual machine VM-2 on the host computer H-3 because the host computers H-2 and H-3 are on separate clusters. It should also be noted that the virtual machines can have host anti-affinity constraints as well. An illustration of a host anti-affinity constraint scenario would look similar to the placement of the virtual machines VM-1 and VM-2 in FIG. 4B where, although placed in the same cluster, the virtual machines VM-1 and VM-2 are placed on separate host computers within that cluster.

Figure 6A:
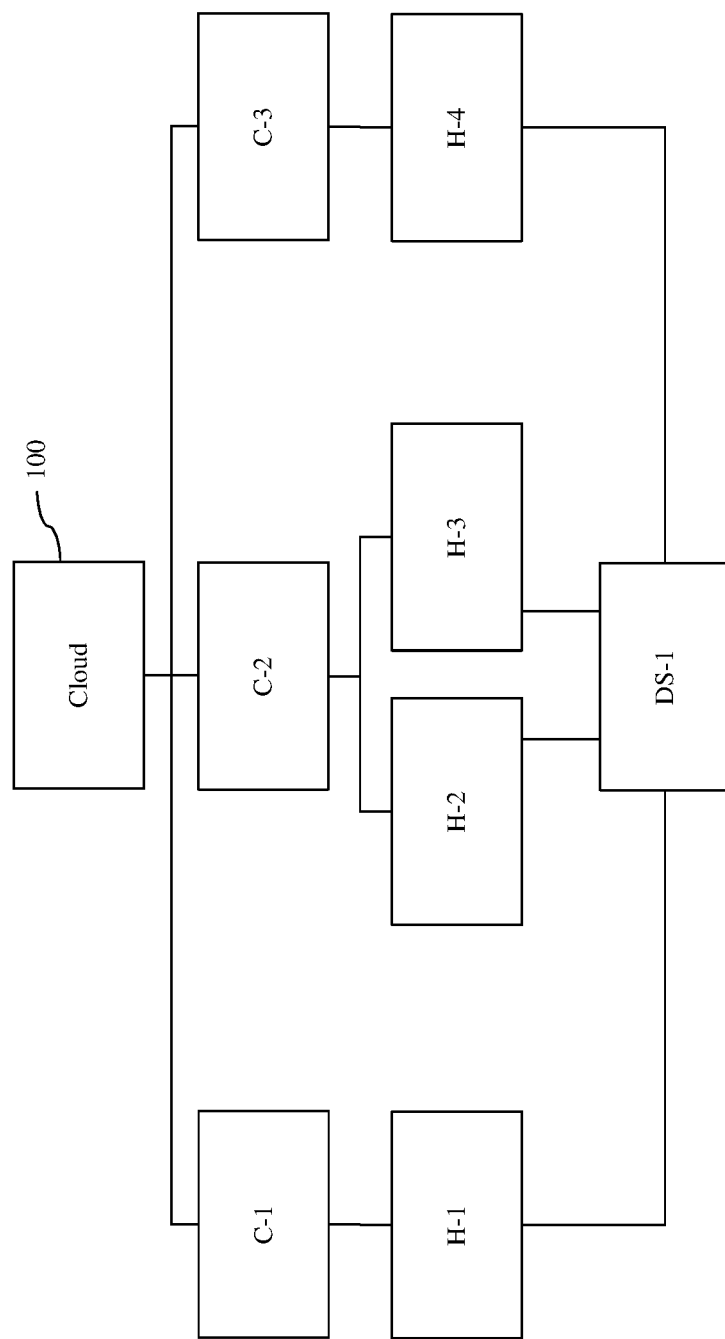
FIGS. 6A and 6B illustrate the placement of two virtual machines in a cloud in conformity with both an affinity constraint and an anti-affinity constraint in accordance with an embodiment of the invention.
Figure 6B:
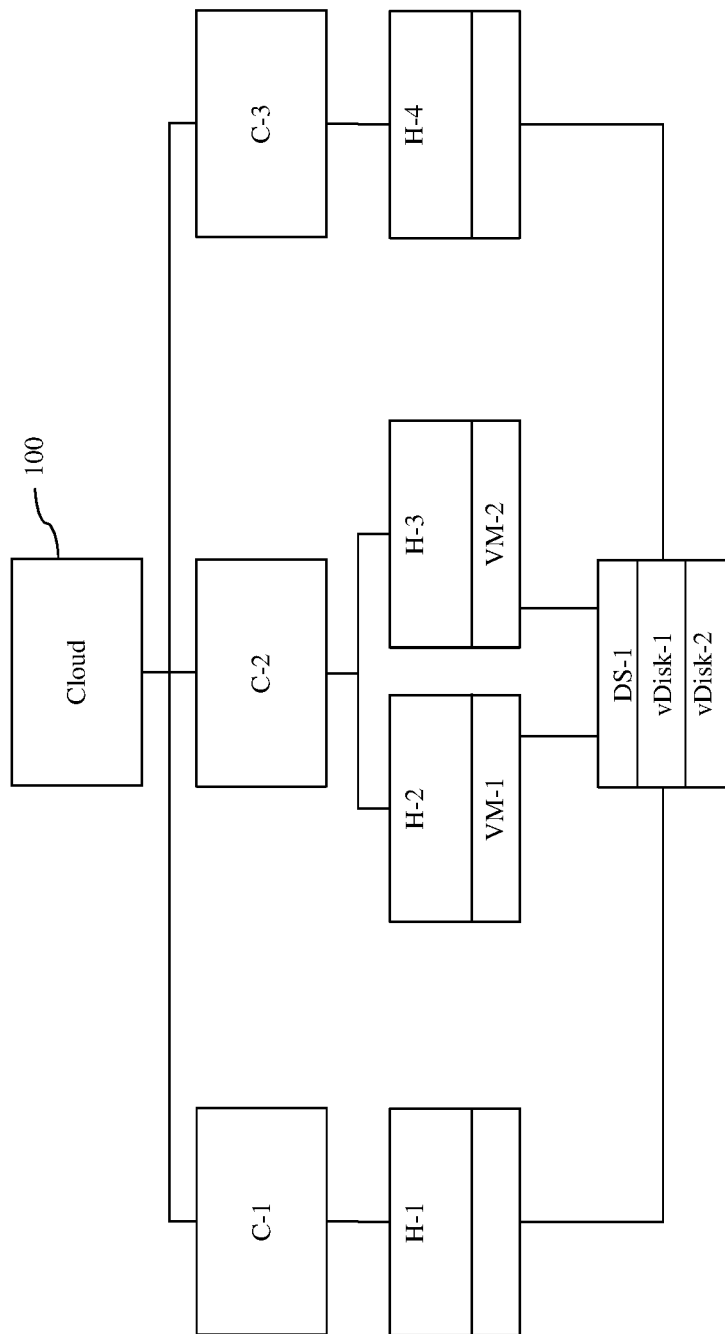

FIGS. 6A and 6B illustrate the placement of two virtual machines VM-1 and VM-2 in the cloud 100 in conformity with both an affinity constraint and an anti-affinity constraint in accordance with an embodiment of the invention. FIG. 6A shows the clusters C-1, C-2, and C-3 located within the cloud 100 prior to placement. The cluster C-1 includes the host computer H-1. The cluster C-2 includes the host computers H-2 and H-3. The cluster C-3 includes the host computer H-4. The clusters C-1, C-2, and C-3 all share access to the datastore DS-1. FIG. 6B shows the cloud after the placement of the virtual machines VM-1 and VM-2. The virtual machines VM-1 and VM-2 have a cluster affinity constraint and a host anti-affinity constraint. As a result, an acceptable placement of the virtual machines VM-1 and VM-2 in this example would be to place the virtual machine VM-1 on the host computer H-2 in the cluster C-2, the virtual machine VM-2 on the host computer H-3 in the same cluster C-2 and a virtual disk "vDisk-1" for the virtual machine VM-1 and a virtual disk "vDisk-2" for the virtual machine VM-2 both on the datastore DS-1. In this particular example, this would be the only acceptable placement because the clusters C-1 and C-2 could not satisfy the host anti-affinity constraint since each cluster only contains one host computer.

Each of the placements illustrated in FIGS. 4A-6B can be automated by the cloud placement module 108 in accordance with embodiments of the invention. When a set of virtual machines (VMs) having affinity and/or anti-affinity constraints is to be placed, the cloud placement module selects clusters to place the VMs using the cloud placement engine 350 with help from the compute, storage, network and PBM fabric components 340, 342, 344 and 346, as further discussed below.

Figure 7:
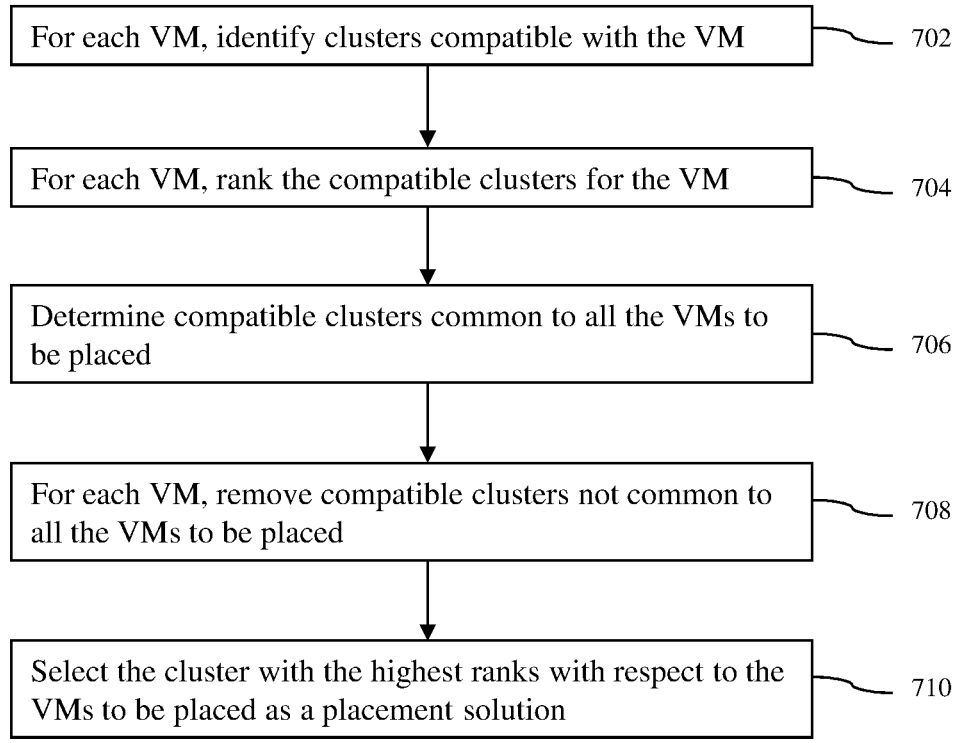
FIG. 7 is a flow diagram of a process for selecting a cluster for placement of virtual machines with a cluster affinity constraint in accordance with an embodiment of the invention.

Turning now to FIG. 7, a flow diagram of a process for selecting a cluster for placement of VMs with a cluster affinity constraint, which is performed by the cloud placement module 108, in accordance with an embodiment of the invention is shown. At block 702, for each VM to be placed, clusters compatible with the VM are identified by the cloud placement engine 350 using information provided by the compute, storage, network and PBM fabric components 340, 342, 344 and 346. At block 704, for each VM to be placed, the compatible clusters for the VM are ranked by the cluster ranker 350. In a particular implementation, the cluster ranker calculates the score of the cluster by computing a score for the cluster's resource pool (e.g., the CPU, vRAM, storage configuration of VM, as well as the existing resource allocation of the resource pool). Specifically, the cluster ranker retrieves the unreserved memory capacity, the unreserved CPU capacity, and the free storage capacity for the cluster. The cluster ranker then retrieves the needed memory capacity, the needed CPU capacity, and the needed storage capacity for the selected VM. The score given to the cluster is then equal to the number of times the selected VM could be placed within the cluster. For example, if a cluster has 10 GB of unreserved memory capacity, 10 GHz of unreserved CPU capacity, and 100 GB of free storage capacity and the VM needs 2 GB of unreserved memory capacity, 2 GHz of unreserved CPU capacity, and 20 GB of free storage capacity, then the cluster would receive a score of 5. In other implementations, the cluster ranker may consider the load of the cluster, the number of undeployed VMs, or the VMs already placed in the cluster. In an embodiment, the compatible clusters for each VM to be placed are sorted according to the rankings. For example, the highest ranking compatible cluster for a VM may be placed at the far left of a list of compatible clusters for the VM. At bock 706, compatible clusters common to all the VMs to be placed are determined. Next, at block 708, for each VM to be placed, compatible clusters not common to all the VMs to be placed are removed. Next, at block 710, the cluster with the highest ranks with respect to the VMs to be placed is selected as a placement solution for the VMs.

This process for selecting a cluster for placement of VMs with a cluster affinity constraint may be implemented using an affinity placement algorithm described by the following pseudo-code:

```
/* This set will have clusters that are compatible with all
VMs                                                          */
IntersectionSet = Intersection of clusters that are
compatible with each VM
if IntersectionSet == EMPTY then
  | return NO_SOLUTION_POSSIBLE;
N = IntersectionSet.size( );
/* Create a hash map of size N and initialize them to
   zero                                                      */
ClusterScores = EmptyHashMap(N);
for each VM do
  |           /* Sorting order needs to be preserved when removing
  |              the elements from the assignments */
  |           Remove clusters that are not in the IntersectionSet
  |           /* Loop each cluster in sorted order */
  |           for each cluster in the list of possible clusters do
  |           |              score = (ActualScore --- RANK) /*
  |                          RANK ∈ 1 to N
  |           |                                              */
  |           |              ClusterScores[cluster] =
  |           |              ClusterScores[cluster] +
  |__        |__             score
             Pick the cluster with the minimum score as the solution
```

In the above affinity placement algorithm, it is assumed that assignment of clusters to each of the VMs to be placed has been determined, i.e., clusters that are compatible to each VM have been identified and ranked. First, IntersectionSet is determined as intersection of clusters that are compatible with each VM. That is, this set includes all the clusters that are compatible with all the VMs to be placed. If this set is empty, then it is determined that no solution is possible. Next, N is defined as the size of the set, i.e., number of clusters in the set. Then, a hash map of size N is created and each entry within the hash table is set to zero. Each hash entry will represent a score for each cluster in the IntersectionSet. Then, for each VM to be placed, clusters that have been assigned to the VM but not in the IntersectionSet are removed. In addition, for each remaining cluster, the score for that cluster is updated by adding the rank number, where 1 is the highest rank. As a result, the final score for each cluster in the IntersectionSet is determined. The algorithm selects the cluster with the lowest score (i.e., the cluster with the highest ranks with respect to the VMs to be placed) as the placement solution.

The above algorithm is further described with an example. In this example, virtual machines vm1, vm2 and vm3 having an affinity constraint are to be placed in a cloud having at least clusters c1, c2, c3, c4 and c5. These virtual machines have the following assignments:
  vm1=c1, c2, c3, c4
  vm2=c1, c4
  vm3=c4, c5, c1, c2

It is assumed that the assigned clusters for each virtual machine are listed in the order of their ranks. Thus, for the virtual machine vm1, the cluster c1 is ranked the highest, i.e., ranked as 1, and the cluster c4 is ranked the lowest, i.e., ranked as 4. The algorithm then prunes this list so that only common clusters remain. That is, clusters not common to all the virtual machines vm1, vm2 and vm3 are removed from the list, while preserving the order of the remaining clusters. The resulting list will be:
  vm1=c1, c4
  vm2=c1, c4
  vm3=c4, c1

The algorithm computes the final scores of the remaining clusters by adding the ranking number for each VM as follows:
  c1 score=1 (vm1)+1 (vm2)+2 (vm3)=4
  c4 score=2 (vm1)+2 (vm2)+1 (vm3)=5

The algorithm then picks the cluster with the lowest score as the placement solution, which in this example is the cluster c1.

Figure 8:
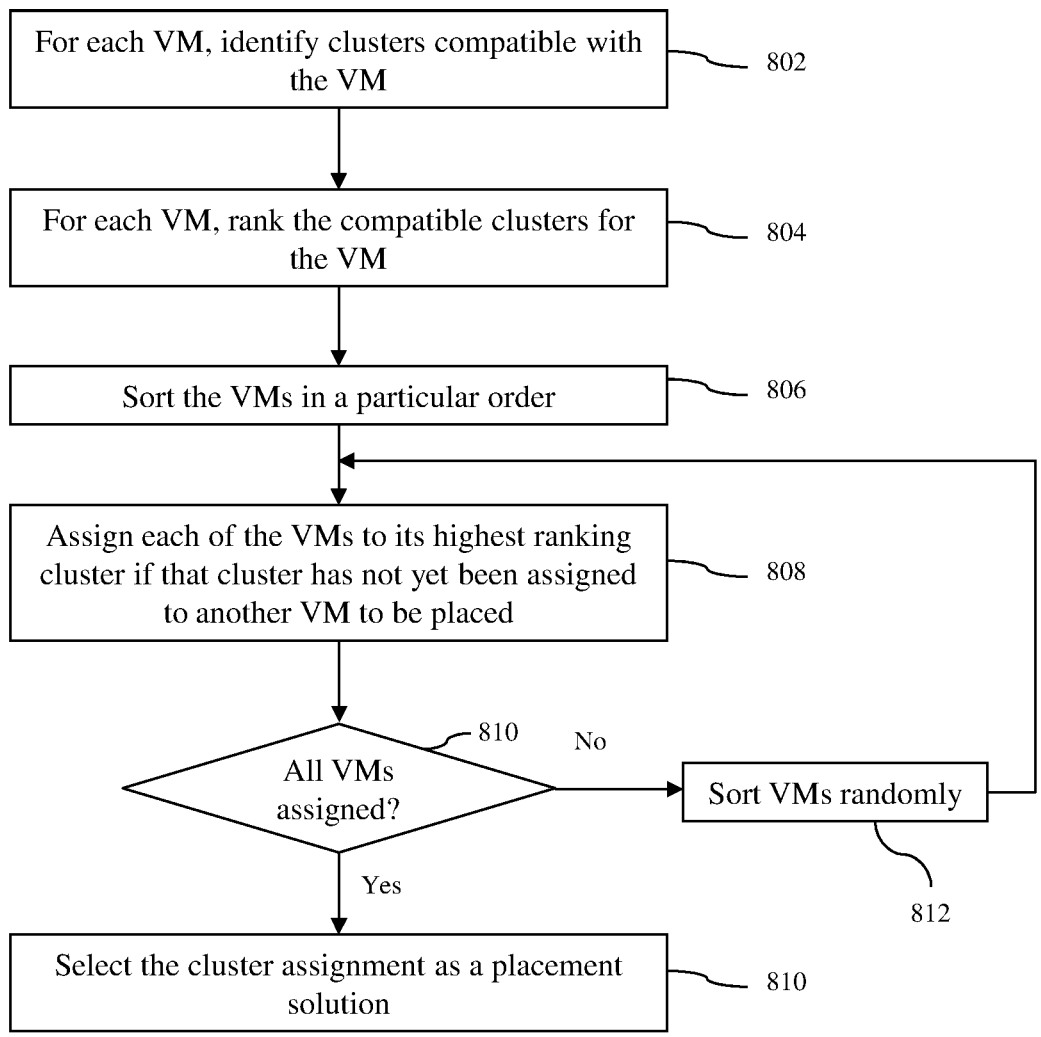
FIG. 8 is a flow diagram of a process for selecting clusters for placement of virtual machines with an anti-affinity constraint in accordance with an embodiment of the invention.

Turning now to FIG. 8, a flow diagram of a process for selecting clusters for placement of VMs with an anti-affinity constraint, which is performed by the cloud placement module 108, in accordance with an embodiment of the invention is shown. At block 802, for each VM to be placed, clusters compatible with the VM are identified by the cloud placement engine 350 using information provided by the compute, storage, network and PBM fabric components 340, 342, 344 and 346. In addition, the number of hosts in each compatible clusters are identified. At block 804, for each VM to be placed, the identified clusters are ranked by the cluster ranker 350. In an embodiment, the compatible clusters for each VM to be placed are sorted according to the rankings. For example, the highest ranking compatible cluster for a VM may be placed at the far left of a list of compatible clusters for the VM. At block 806, the VMs to be placed are sorted in a particular order. In one implementation, the order of VMs is based on the degree of placement constraint. Typically, a VM has a higher placement constraint if the number of compatible host computers for the VM is lower. In the case where two VMs have the same number of compatible host computers, the VM with a fewer compatible clusters will be designated as having a higher placement constraint. At block 808, each of the VMs is assigned to its highest ranking cluster if that cluster has not yet been assigned to another VM to be placed in the particular order. Thus, the first VM in the predefined order is assigned to its highest ranking cluster, the second VM in the predefined order is assigned to its highest ranking cluster, and so on. In an alternative embodiment, if the highest cluster for a VM has been assigned, then the next highest cluster may be assigned to that VM.

At block 810, a determination is made whether all the VMs have been assigned. If all the VMs have not been assigned, then the process proceeds to block 812, where the VMs are randomly sorted. The process then returns to block 808 to try to assign the highest ranking clusters to all the VMs. If all the VMs have been assigned, the process proceeds to block 814, where the assignment of the clusters to the VMs is selected as a placement solution.

This process for selecting clusters for placement of VMs with an anti-affinity constraint may be implemented using an anti-affinity placement algorithm. In this algorithm, the ranking of clusters for each VM to be placed may involve a ranking process according to dWeights, described in "dWeights: Taming the Multi-Headed Monster for VM Placement in the Cloud" by Kesavan et al., which is incorporated herein by reference.

This anti-affinity placement algorithm is described with an example. In this example, virtual machines vm1, vm2 and vm3 having an anti-affinity constraint are to be placed in a cloud having at least clusters c1, c2, c3 and c4. In addition, compatible clusters with the corresponding number of possible host computers have been identified and ranked for each of the virtual machines as follows:

vm1=c1:1, c2:1, c3:2
vm2=c2:1, c3:2
vm3=c3:4

The algorithm then sort the VMs in the order of most placement constrained VM to least placement constrained VM. Thus, in this example, the list is sorted as follows:

vm2=c2:1, c3:2
vm3=c3:4
vm1=c1:1, c2:1, c3:2

In the above list, even though the virtual machine vm2 is compatible to two clusters, the virtual machine vm2 has only three possible host computers, whereas the virtual machine vm3 has four possible host computers. Thus, the virtual machine vm2 is more placement constrained than the virtual machine vm3.

The algorithm then assigns the first virtual machine in the order of virtual machines, i.e., the virtual machine vm2, to its highest ranking cluster, which is the cluster c2. The second virtual machine in the order of virtual machines, i.e., the virtual machine vm3, is then assigned to its highest ranking cluster, which is the cluster c3. The third and last virtual machine in the order of virtual machines, i.e., the virtual machine vm1, is then assigned to its highest ranking cluster, which is the cluster c1. Since all the VMs to be placed have been assigned, this assignment is selected as a placement solution.

Figure 9A:
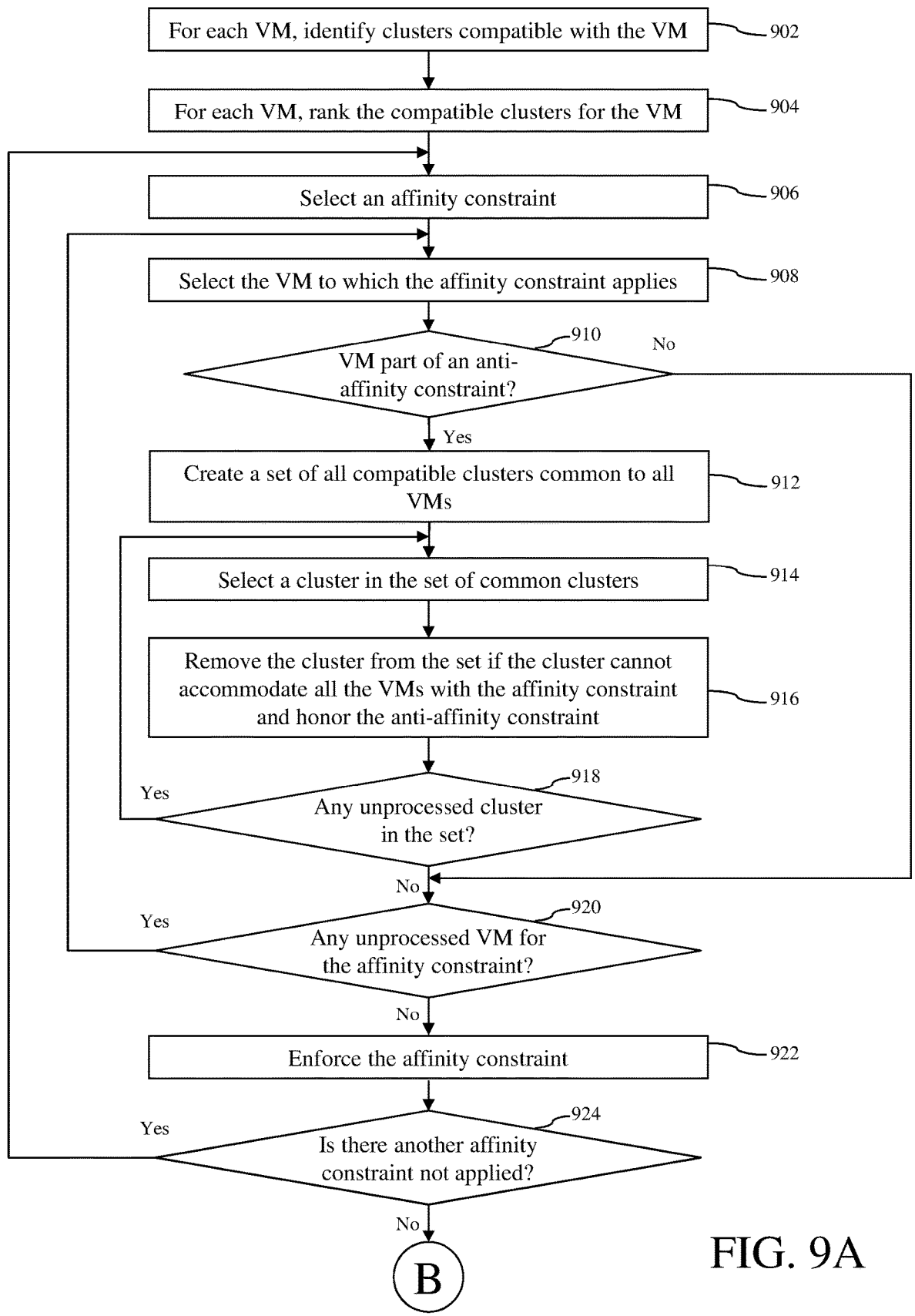
FIGS. 9A and 9B illustrate a flow diagram of a process for selecting clusters for placement of virtual machines with affinity and anti-affinity constraints in accordance with an embodiment of the invention.
Figure 9B:
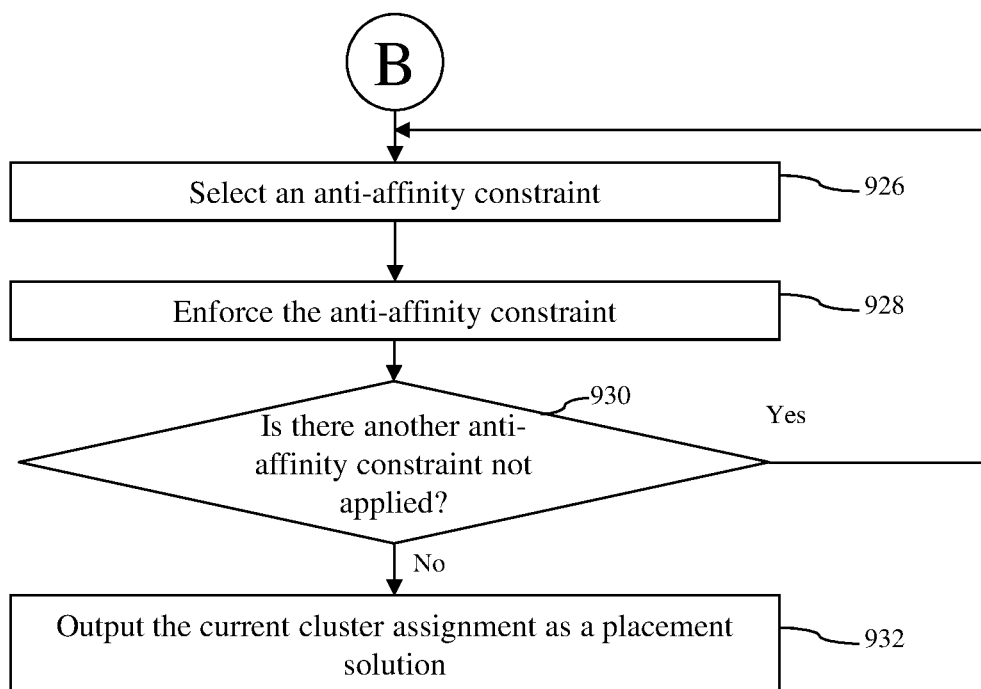

Turning now to FIGS. 9A and 9B, a flow diagram of a process for selecting clusters for placement of VMs with affinity and anti-affinity constraints, which is performed by the cloud placement module 108, in accordance with an embodiment of the invention is shown. At block 902, for each VM to be placed, clusters compatible with the VM are identified by the cloud placement engine 350 using information provided by the compute, storage, network and PBM fabric components 340, 342, 344 and 346. In addition, the number of hosts in each compatible cluster may be identified. At block 904, for each VM to be placed, the identified clusters are ranked by the cluster ranker 350. In an embodiment, the compatible clusters for each VM to be placed are sorted according to the rankings. For example, the highest ranking compatible cluster for a VM may be placed at the far left of a list of compatible clusters for the VM.

At block 906, an affinity constraint is selected. If there are more than one affinity constraint, the selection of the affinity constraint may be predetermined or random. At block 908, a VM to which the affinity constrain applies is selected. If there are more than one VM with the same affinity constraint, the selection of the affinity constraint may be predetermined or random. At block 910, a determination is made whether the VM is part of an anti-affinity constraint. If the VM is not part of any anti-affinity constraint, the process then proceeds to block 920. However, if the VM is part of any anti-affinity constraint, then the process proceeds to block 912, where a set of all compatible clusters common to all the VMs associated with the affinity constraint is created. At block 914, a cluster in the set of common clusters is selected. If there are more than one common cluster in the set, the selection of the cluster may be predetermined or random. At block 916, the cluster is removed from the set if the cluster cannot accommodate all the VMs with the affinity constraint and honor the anti-affinity constraint.

Next, at block 918, a determination is made whether an unprocessed cluster remains in the set of common clusters. If yes, then the process returns to block 914, where another cluster in the set of common clusters is selected. However, if no unprocessed cluster remains, then the process proceeds to block 920, where a determination is made whether any unprocessed VM associated with the affinity constraint remains. If yes, then the process returns to block 908, where another VM is selected. However, if no unprocessed VM remains, then the process proceeds to block 922, where the affinity constraint is enforced for the associated VMs to determine cluster assignments for the associated VMs. In an embodiment, the affinity constraint is enforced by executing the affinity placement process illustrated in FIG. 7. However, in executing the affinity placement process, duplicate process steps may not be performed.

At block 924, a determination is made whether there is another affinity constraint not applied. If yes, then the process returns to block 906, where another affinity constraint is selected. However, if there is no affinity constraint not applied, then the process proceeds to block 926, where an anti-affinity constraint is selected. If there are more than one affinity constraint, the selection of the affinity constraint may be predetermined or random. At block 928, the anti-affinity constraint is enforced for the associated VMs to determine cluster assignments for the associated VMs. In an embodiment, the anti-affinity constraint is enforced by executing the anti-affinity placement process illustrated in FIG. 8. However, in executing the anti-affinity placement process, duplicate process steps may not be performed. At block 930, a determination is made whether there is an anti-affinity constraint not yet applied. If yes, then the process back to block 926, where another anti-affinity constraint is selected. If there is no other anti-affinity constraint not yet applied, then the process proceeds to block 932, where the current cluster assignments are output as a placement solution.

This process for selecting clusters for placement of VMs with affinity and anti-affinity constraints may be implemented using an combined placement algorithm described by the following pseudo-code:

```
for each affinity rule do
|       for each VM in the rule do
|       |       if VM is part of anti-affinity rule then
|       |
|       |
|       |
|       |
|                       CommonClusters = list of clusters common to
|                       all the VMs for each cluster in
|                       CommonClusters do
|                       |       ensure that the hub can accommodate the
|                       |       VMs honoring the anti-affinity rule
|                       |       If a cluster cannot accommodate, remove it
|       |_      |_      from the list.
|       enforceAffinityRule( )
for each anti-affinity rule do
|_      enforceAntiAffinityRule( )
```

In this combined placement algorithm, the functions AffinityRule( ) and AntiAffinityRule( ) refer to the affinity placement algorithm and the anti-affinity placement algorithm described above. In addition, the CommonClusters in the above algorithm is equivalent to the IntersectionSet in the affinity placement algorithm. The combined placement algorithm operates to make sure that when both affinity and anti-affinity are specified, the clusters considered for affinity rules can satisfy anti-affinity constraints as well. In the combined placement algorithm, if a VM with an anti-affinity rule has been assigned to a cluster when enforceAffinityRule( ) is executed, this VM is treated as being assigned when enforceAntiAffinityRule( ) is executed. Thus, the VM that has already been assigned would not be sorted with the other VMs with the anti-affinity constraint.

The above algorithm is further described with an example. In this example, virtual machines vm1, vm2 and vm3 are to be placed in a cloud having at least clusters c1, c2, c3 and c4 in accordance with following rules:
rule A=cluster affinity between vm1 and vm2
rule B=cluster anti-affinity between vm1 and vm4
rule C=host affinity between vm1 and vm3
rule D=host anti-affinity between vm1 and vm2

The virtual machines vm1, vm2, vm3 and vm4 have the following cluster compatibilities:
vm1=c1, c2, c4
vm2=c2, c4
vm3=c1, c2, c4
vm4=c3

The cluster c1, c2, c3 and c4 have two, one, four and three host computers, respectively.

In order to place the virtual machines vm1, vm2, vm3 and vm4, one of the affinity rules, e.g., the rule A (involving the virtual machines vm1 and vm2), is selected by the combined algorithm. Next, one of the VMs to which the rule A applies, e.g., the virtual machine vm1, is selected. Then, it is determined if any anti-affinity rules apply to the virtual machines, which results in identifying the rules B and D. Any clusters that cannot accommodate the rule A as well as the rules B and D are removed from consideration as clusters where the virtual machine can be placed. Thus, because the rule D cannot be satisfied if the virtual machine vm1 is placed on the cluster c2 (there is only one host computer in the cluster c2 and satisfaction of an anti-host rule requires at least two host computers in a cluster), the cluster c2 is removed from consideration and only cluster c4 remains as a cluster that can accommodate the virtual machines vm1 and vm2. The next virtual machine to which rule A applies is selected, i.e., the virtual machine vm2. Then, a determination is made if any anti-affinity rules apply to the virtual machine vm2. In this example, the anti-affinity rule is the rule D. Any clusters that cannot accommodate the rule A as well as the rule D are removed from consideration as clusters where the virtual machine can be placed. There are none since the cluster c2 has already been removed. Next, the affinity placement algorithm is enforced, which results in the virtual machines vm1 and vm2 being assigned to the cluster c4. When the virtual machines vm1 and vm2 are actually placed in the cluster c4, the cluster resource management module 112 in the cluster c4 will manage the placement of the virtual machine vm2 on a host computer within the cluster c4 that is different than the host computer on which the virtual machine vm1 is placed.

Next, another affinity rule, i.e., the rule C (involving the virtual machines vm1 and vm3), is selected by the combined algorithm. Next, one of the VMs to which the rule A applies, e.g., the virtual machine vm1, is selected. Then, it is determined if any anti-affinity rules apply to the virtual machines, which results in identifying the rules B and D. Any clusters that cannot accommodate the rule C as well as the rules B and D are removed from consideration as clusters where the virtual machine can be placed. Thus, because the rule D cannot be satisfied if the virtual machine vm1 is placed on the cluster c2 (there is only one host computer in the cluster c2 and satisfaction of an anti-host rule requires at least two host computers in a cluster), the cluster c2 is removed from consideration and only clusters c1 and c4 remain as clusters that can accommodate the virtual machines vm1 and vm3. The next virtual machine to which rule C applies is selected, i.e., the virtual machine vm3. Then, a determination is made if any anti-affinity rules apply to the virtual machine vm3. In this example, no anti-affinity rule applies to the virtual machine vm3. The affinity placement algorithm is then enforced for the virtual machines vm1 and vm3, which results in the virtual machines vm1 and vm3 being assigned to the cluster c4. When the virtual machines vm1 and vm3 are actually placed in the cluster c4, the cluster resource management module 112 in the cluster c4 will manage the placement of the virtual machine vm3 on the same host computer in the cluster c4 as the virtual machine vm1.

Since all of the affinity rules applied, one of the anti-affinity rule is selected, e.g., the rule B (involving the virtual machines vm1 and vm4). Next, the anti-affinity placement algorithm is enforced. Since the virtual machine vm1 has already been assigned to the cluster c4, only the virtual machine vm4 needs to be assigned. In this example, the virtual machine vm4 is assigned to its highest ranking cluster, i.e., the cluster c3.

Next, another anti-affinity rule is selected, e.g., the rule D (involving the virtual machines vm1 and vm2). Next, the anti-affinity placement algorithm is enforced. Since the virtual machines vm1 and vm2 have already been assigned to the cluster c4, no additional assignments are made.

The process then comes to an end since there are no more anti-affinity rules. The current cluster assignments are then output as a placement solution for the virtual machines vm1, vm2, vm3 and vm4. As a result, these virtual machines have been assigned to clusters for placement and all the affinity and anti-affinity rules have been satisfied.

Figure 10:
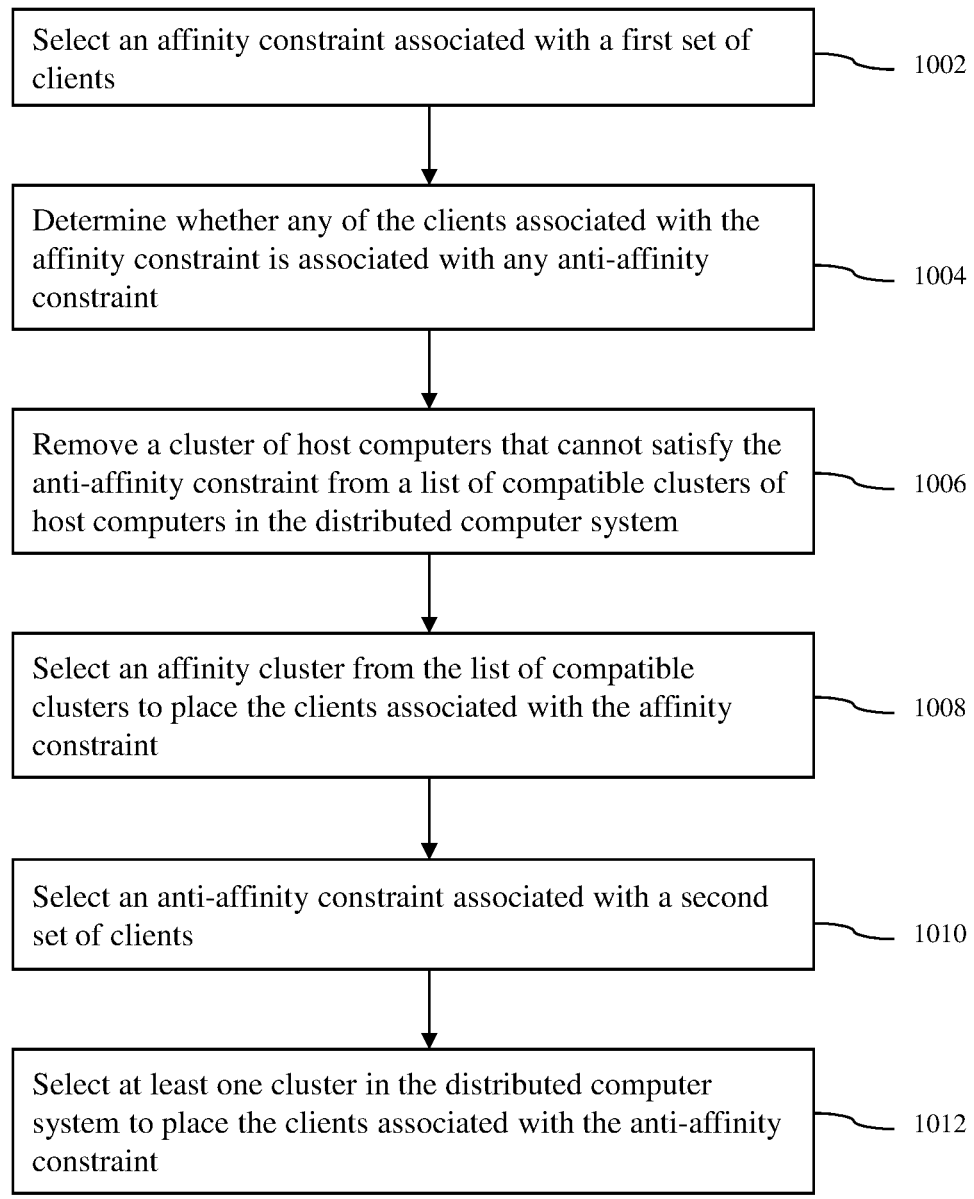
FIG. 10 is a flow diagram of a method for performing automatic placement of clients in a distributed computer system in accordance with an embodiment of the invention.

A method for performing automatic placement of clients, e.g., VMs, in a distributed computer system in accordance with an embodiment of the invention is described with reference to a flow diagram of FIG. 10. At block 1002, an affinity constraint associated with a first set of clients is selected. At block 1004, a determination is made whether any of the clients associated with the affinity constraint is associated with any anti-affinity constraint. At block 1006, a cluster of host computers that cannot satisfy the anti-affinity constraint from a list of compatible clusters of host computers in the distributed computer system is removed. The compatible clusters are clusters that are compatible with the clients associated with the affinity constraint. At block 1008, an affinity cluster from the list of compatible clusters is selected to place the clients associated with the affinity constraint. At block 1010, an anti-affinity constraint associated with a second set of clients is selected. At block 1012, at least one cluster in the distributed computer system is selected to place the clients associated with the anti-affinity constraint.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A cloud management server, comprising:
   at least one processor; and
   a non-transitory computer-readable storage medium in communication with the at least one processor, wherein the at least one processor is configured to execute program instructions embodied in the non-transitory computer-readable storage medium to perform operations comprising:
   identifying at least one policy constraint comprising an affinity constraint associated with a set of clients;
   generating a list of compatible clusters of a plurality of clusters that correspond with a plurality of placement solutions that satisfy the at least one policy constraint; and
   placing the set of clients according to one of the plurality of placement solutions comprising a compatible cluster on the list of compatible clusters.

2. The cloud management server of claim 1, wherein the set of clients comprises a first and a second client, wherein the affinity constraint specifies that the first and the second client should be placed in a same cluster of the plurality of clusters.

3. The cloud management server of claim 1, wherein:
   the at least one policy constraint further comprises an anti-affinity constraint; and
   wherein the at least one processor is further configured to perform operations comprising:
   determining that at least one client in the set of clients associated with the affinity constraint is associated with the anti-affinity constraint; and
   removing from the list of compatible clusters at least one of the plurality of clusters that cannot accommodate the anti-affinity constraint.

4. The cloud management server of claim 1, wherein the compatible cluster comprises a plurality of hosts that share a datastore.

5. The cloud management server of claim 1, wherein the at least one processor is further configured to perform operations comprising:
   aggregating at least one of: compute, storage, or network resources of a plurality of hosts into the plurality of clusters.

6. The cloud management server of claim 5, wherein generating the list of compatible clusters comprises ranking at least the compatible cluster on the list of compatible clusters according to a score of a pool of compute, storage, or network resources of the compatible cluster associated with the at least one of: the compute, the storage, or the network resources of the plurality of hosts.

7. The cloud management server of claim 5, wherein the clients are software entities executable by the plurality of hosts.

8. A non-transitory computer-readable storage medium containing program instructions, wherein execution of the program instructions by at least one processor of a computer system causes the at least one processor to perform steps comprising:
   identifying at least one policy constraint comprising an affinity constraint associated with a set of clients;
   generating a list of compatible clusters of a plurality of clusters that correspond with a plurality of placement solutions that satisfy the at least one policy constraint; and
   placing the set of clients according to one of the plurality of placement solutions comprising a compatible cluster on the list of compatible clusters.

9. The non-transitory computer-readable storage medium of claim 8, wherein the set of clients comprises a first and a second client, wherein the affinity constraint specifies that the first and the second client should be placed in a same cluster of the plurality of clusters.

10. The non-transitory computer-readable storage medium of claim 8, wherein:
   the at least one policy constraint further comprises an anti-affinity constraint; and
   wherein the at least one processor is further configured to perform steps comprising:
   determining that at least one client in the set of clients associated with the affinity constraint is associated with the anti-affinity constraint; and
   removing from the list of compatible clusters at least one of the plurality of clusters that cannot accommodate the anti-affinity constraint.

11. The non-transitory computer-readable storage medium of claim 8, wherein the compatible cluster comprises a plurality of hosts that share a datastore.

12. The non-transitory computer-readable storage medium of claim 8, wherein the at least one processor is further configured to perform operations comprising:
   aggregating at least one of: compute, storage, or network resources of a plurality of hosts into the plurality of clusters.

13. The non-transitory computer-readable storage medium of claim 12, wherein generating the list of compatible clusters comprises ranking at least the compatible cluster on the list of compatible clusters according to a score of a pool of compute, storage, or network resources of the compatible cluster associated with the at least one of: the compute, the storage, or the network resources of the plurality of hosts.

14. The non-transitory computer-readable storage medium of claim 12, wherein the clients are software entities executable by the plurality of hosts.

15. A method, comprising:
identifying, by at least one computing device, at least one policy constraint comprising an affinity constraint associated with a set of clients;
generating, by the at least one computing device, a list of compatible clusters of a plurality of clusters that correspond with a plurality of placement solutions that satisfy the at least one policy constraint; and
placing, by the at least one computing device, the set of clients according to one of the plurality of placement solutions comprising a compatible cluster on the list of compatible clusters.

16. The method of claim 15, wherein the set of clients comprises a first and a second client, wherein the affinity constraint specifies that the first and the second client should be placed in a same cluster of the plurality of clusters.

17. The method of claim 15, wherein:
the at least one policy constraint further comprises an anti-affinity constraint; and
wherein the method further comprises:
determining, by the at least one computing device, that at least one client in the set of clients associated with the affinity constraint is associated with the anti-affinity constraint; and
removing, by the at least one computing device, from the list of compatible clusters at least one of the plurality of clusters that cannot accommodate the anti-affinity constraint.

18. The method of claim 15, wherein the compatible cluster comprises a plurality of hosts that share a datastore.

19. The method of claim 15, further comprising:
aggregating, by the at least one computing device, at least one of: compute, storage, or network resources of a plurality of hosts into the plurality of clusters.

20. The method of claim 19, wherein generating the list of compatible clusters comprises ranking at least the compatible cluster on the list of compatible clusters according to a score of a pool of compute, storage, or network resources of the compatible cluster associated with the at least one of: the compute, the storage, or the network resources of the plurality of hosts.

* * * * *